United States Patent Office 3,632,620
Patented Jan. 4, 1972

3,632,620
PREPARATION OF ISOCYANATES FROM CARBODIIMIDES
Ehrenfried H. Kober, Hamden, and Wilhelm J. Schnabel, Branford, Conn., assignors to Olin Mathieson Chemical Corporation
No Drawing. Filed June 26, 1968, Ser. No. 740,064
Int. Cl. C07c 119/04
U.S. Cl. 260—453 P                    4 Claims

ABSTRACT OF THE DISCLOSURE

Organic carbodiimides are reacted with carbon monoxide and/or carbon dioxide in the presence of a catalyst at an elevated pressure and elevated temperature to produce organic isocyanates. The catalyst is preferably at least one metal or compound of a metal found in Groups Ib, IIb, IIIb, IVa, IVb, Va, VIa, VIb, IIIa, VIIa, VIII, and in the Lanthanide series of the Periodic Table.

This invention relates to the preparation of organic isocyanates from organic carbodiimides.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. During the operation of processes of this type a relatively large proportion of impurities such as polyureas, carbodiimides, biurets, isocyanate polymers, and the like are formed in the various process streams.

Numerous techniques have been developed to separate the desired organic isocyanate products from these impurities. For example U.S. Pat. No. 3,140,305, issued July 7, 1964, describes a thin film type evaporator for converting isocyanate-containing aromatic compounds into aromatic diisocyanates and recovering the aromatic diisocyanates so produced. U.S. Pat. No. 3,169,141, issued Feb. 9, 1965, describes a process for separating organic isocyanates from carbodiimides or reaction products containing them by solvent extraction with a liquid organic silane.

The presence of organic carbodiimide type impurities in organic isocyanates is undesirable because it ties up valuable moieties capable of forming the desired isocyanate.

There is a great need at the present time for a simplified process for converting carbodiimides to organic isocyanates.

It is a primary object of this invention to provide an improved process for the preparation of organic isocyanates. Still another object of the invention is to provide a simplified technique for removing organic carbodiimides when they form in processes for preparing organic isocyanates.

These and other objects of the invention will be apparent from the following detailed description thereof.

It has now been discovered that the foregoing objects are accomplished when an organic carbodiimide is reacted with carbon monoxide and/or carbon dioxide in the presence of a catalyst at an elevated pressure and elevated temperature to produce an organic isocyanate.

More in detail, any organic carbodiimide, or a complex containing carbodiimide capable of forming an organic isocyanate under the reaction conditions applied may be employed as a reactant in the process of this invention. Suitable organic carbodiimides are represented by the structural formula: $RN=C=NR'$, where R and R' may be the same or a different moiety selected from the group consisting of alkyl containing 1 to 18 carbon atoms, cycloalkyl containing between about 3 and about 12 carbon atoms, aryl containing between about 6 and about 10 carbon atoms, and alkylaryl containing between about 7 and about 16 carbon atoms. Polycarbodiimides of the above structural formula may also be employed.

Carbodiimides are formed from isocyanates in accordance with the following equation:

(I)  $R''NCO \rightarrow R''N=C=NR'' + CO_2$ where R'' is either R or R', as defined above. Typical examples of carbodiimides suitable for use as a reactant in the process of this invention are those formed in accordance with Equation I from organic isocyanates such as the following:

(I) Aromatic isocyanates
(a) Phenylisocyanate
(b) Naphthylisocyanate
(c) Isocyanatophenothiazines
(d) Biphenylisocyanate
(e) Bis(isocyanatophenyl)methanes
(f) Bis(isocyanatophenyl)ethers
(g) Bis(isocyanatophenyl)thioethers
(h) Bis(isocyanatophenyl)sulfones
(i) Isocyanatodiphenoxy alkanes (II) Cycloaliphatic isocyanates
(a) Cyclobutyl isocyanate
(b) Cyclopentyl isocyanate
(c) Cyclohexyl isocyanate
(d) Diisocyanato cyclohexanes
(e) Bis(isocyanatocyclohexyl)methanes (III) Aliphatic isocyanates
(a) Methyl isocyanate
(b) Ethyl isocyanate
(c) Propyl isocyanate
(d) Butyl isocyanate
(e) Hexyl isocyanate
(f) Octyl isocyanate
(g) Octadecyl isocyanate
(h) Diisocyanatoethane
(i) Diisocyanatopropanes
(j) Diisocyanatobutanes
(k) Diisocyanatohexanes
(l) Diisocyanatodecanes
(m) Benzyl isocyanate
(n) Bromobenzyl isocyanates
(o) Isocyanatobenzyl isocyanates
(p) Methoxygenzyl isocyanates
(q) Bis(isocyanatomethyl)cyclohexanes
(r) Xylylene diisocyanates All of the aforementioned compounds may be substituted with one or more additional substituents such as nitro, nitroalkyl, alkyl, alkenyl, alkoxy, aryloxy, halogen, alkylthio, arylthio, carboxalkyl, cyano, isocyanato, and the like. Specific examples of suitable substituted organic carbodiimides which can be used as reactants are those derived from the following organic isocyanates:

(1) o-Tolylisocyanate
(2) m-Tolylisocyanate
(3) p-Tolylisocyanate
(4) o-Isocyanato-p-xylene
(5) 2-methyl-1-naphthyl isocyanate
(6) m-Phenylene diisocyanate
(7) p-Phenylene diisocyanate
(8) 2,4-tolylene diisocyanate
(9) 2,6-tolylene diisocyanate
(10) Diisocyanatomesitylene
(11) 4,4'-diisocyanatobiphenyl

(12) 2,4-diisocyanatobiphenyl
(13) 4,4'-diisocyanatodibenzyl
(14) Bis(p-isocyanatophenyl)methane
(15) Bis(2,4-diisocyanatophenyl)methane
(16) Bis(p-isocyanatophenyl)ether
(17) Bis(2,4-diisocyanatophenyl)ether
(18) Bis(p-isocyanatophenyl)thioether
(19) Bis(p-isocyanatophenyl)sulfone
(20) Bis(p-isocyanatophenoxy)ethane
(21) α,α'-Diisocyanato-p-xylene
(22) 2,4,6-toluene triisocyanate
(23) 1,3,5-triisocyanatobenzene
(24) 1-chloro-2-isocyanatobenzene
(25) 1-chloro-4-isocyanatobenzene
(26) 1-chloro-3-isocyanatobenzene
(27) 2-chloro-6-isocyanatotoluene
(28) 4-chloro-3-isocyanatotoluene
(29) 1-chloro-2,4-diisocyanatobenzene
(30) 1,4-dichloro-2-isocyanatobenzene
(31) Alpha-chloro-p-isocyanatotoluene
(32) 1,3,5-trichloro-2-isocyanatobenzene
(33) 1,3,5-trichloro-2,4-diisocyanatobenzene
(34) 1,2-dichloro-4-isocyanatobenzene
(35) Alpha-chloro-m-isocyanatotoluene
(36) 1,2,4-trichloro-5-isocyanatobenzene
(37) 1-bromo-4-isocyanatobenzene
(38) 1-bromo-2-isocyanatobenzene
(39) 1-bromo-3-isocyanatobenzene
(40) 1-bromo-2,4-diisocyanatobenzene
(41) α,α-Dibromo-p-isocyanatotoluene
(42) α-Bromo-p-isocyanatotoluene
(43) 1-fluoro-4-isocyanatobenzene
(44) 1-fluoro-2,4-diisocyanatobenzene
(45) 1-fluoro-2-isocyanatobenzene
(46) o-Methoxyphenylisocyanate
(47) p-Methoxyphenylisocyanate
(48) p-Ethoxyphenylisocyanate
(49) o-Ethoxyphenylisocyanate
(50) Ethoxy-2,4-phenylene diisocyanate
(51) Methoxy-2,4-phenylene diisocyanate
(52) 1-chloro-2,4-dimethoxy-5-isocyanatobenzene
(53) 1,4-dimethoxy-2-isocyanatobenzene
(54) Carbethoxyphenylisocyanate
(55) 3,3'-dimethoxy-4,4'-diisocyanato-biphenyl
(56) 3,3'-dimethyl-4,4'-diisocyanato-biphenyl In addition, carbodiimides derived from isomers and mixtures of the aforesaid organic isocyanato compounds and substituted organic isocyanato compounds as well as homologues and other related compounds may also be employed to form the isocyanates in accordance with the process of this invention.

Catalysts which may be utilized in the novel technique of this invention include metals and compounds of metals found in Groups Ib, IIb, IIIa, IIIb, IVa, IVb, Va, VIa, VIb, VIIa, VIII and in the Lanthanide series of the Periodic Table shown on page 122 of Inorganic Chemistry, by Moeller, John Wiley and Sons, Inc., 1952. It was found that certain metals and compounds of these metals have a much greater catalytic effect than others, when compared on an equal weight basis. Those metals, in elemental or compound form, which are preferred because they show the greatest catalytic effect are as follows:

(1) Palladium
(2) Rhodium
(3) Vanadium
(4) Molybdenum
(5) Ruthenium
(6) Tungsten
(7) Tantalum
(8) Chromium
(9) Niobium
(10) Platinum
(11) Cobalt
(12) Nickel
(13) Germanium
(14) Tin
(15) Osmium
(16) Copper
(17) Silver Other metals which may also be employed as a catalyst, either elemental or a compound form, but which are less effective than those listed above are as follows:

(1) Aluminum
(2) Scandium
(3) Manganese
(4) Iron
(5) Zinc
(6) Gallium
(7) Yttrium
(8) Zirconium
(9) Masurium
(10) Lutecium
(11) Cadmium
(12) Indium
(13) Lanthanum
(14) Hafnium
(15) Illinium
(16) Rhenium
(17) Iridium
(18) Titanium
(19) Gold
(20) Mercury
(21) Thallium
(22) Lead
(23) Cerium
(24) Praseodymium
(25) Neodymium
(26) Samarium
(27) Europium
(28) Gadolinum
(29) Terbium
(30) Dysprosium
(31) Holmium
(32) Erbium
(33) Thulium
(34) Ytterbium Compounds of the above elements which can be utilized in accordance with the process of this invention include oxides, sulfates, nitrates, halides, carbonates, sulfides, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, palladium dichloride, palladium difluoride and palladium diiodide; rhodium halides such as rhodium tribromide, rhodium trichloride, rhodium trifluoride, and rhodium triiodide; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_3$), and rhodium dioxide ($RhO_2$); chromic oxide ($Cr_2O_3$), chromium dioxide ($CrO_2$) and chromous oxide (CrO); molybdenum sesquioxide ($Mo_2O_3$), molybdenum dioxide ($MoO_2$), and molybdenum trioxide ($MoO_3$); ruthenium trichloride ($RuCl_3$), ruthenium pentafluoride ($RuF_5$), ruthenium hydroxide [$Ru(OH)_2$], ruthenium dioxide ($RuO_2$), and ruthenium tetraoxide ($RuO_4$); niobium oxide ($NbO_2$), and niobium pentoxide ($Nb_2O_5$), tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($O_3$); and vanadium tetraoxide ($V_2O_4$), and vanadium pentoxide $V_2O_5$), mixtures thereof, and the like.

In addition, carbonyls of certain elements such as nickel, cobalt, iron, rhodium, molybdenum, chromium, tungsten, and ruthenium, and carbonyl chlorides of certain elements such as palladium, rhodium, ruthenium and any of the aforesaid elements capable of forming carbonyls or carbonyl chlorides can be used as the catalyst. Mixtures of two or more of these carbonyl compounds may be employed as the catalyst system.

Furthermore, the aforesaid catalyst compositions may be used as a mixture or complex with heteroaromatic compounds. Heteroaromatic compounds containing only nitrogen and carbon in the ring are preferably used, but one which contains only carbon and sulfur or only carbon and oxygen, or carbon and two or more elements selected from the group consisting of nitrogen, sulfur, and oxygen may also be employed. Typical heteroaromatic compounds include pyridine, pyridine-1-oxide, 2-chloropyridine, isoquinoline, quinoline, 1-methyl imidazole, 4,6-dimethyl dimethyl pyridine, thiophene, dibenzofuran, 2,5-diphenyl-oxazole, 2-mercaptobenzothiazole, thionaphthene, and mixtures thereof and the like.

Although all of the foresaid catalysts have some effect upon increasing the yield of organic isocyanates, certain system are significantly more effective than other. Included in these more effective systems are the following:

(1) Palladium dichloride
(2) Rhodium trichloride
(3) Palladium dichloride and vanadium pentoxide
(4) Palladium dichloride and molybdenum dioxide
(5) Rhodium trichloride and vanadium pentoxide
(6) Rhodium trichloride and molybdenum trioxide
(7) Molybdenum hexacarbonyl
(8) Palladium dipyridine dichloride
(9) Molybdenum trioxile and cupric chloride
(10) Palladium dipyridine dichloride and $MoO_3$
(11) Palladium diisoquinoline dichloride
(12) Rhodium trichloride and molybdenum hexacarbonyl The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst. The proportion of catalyst is generally equivalent to between about 0.1 and about 100 percent, and preferably between about 1 and about 60 percent by weight of the organic carbodiimide compound. However, greater or lesser proportions may be employed if desired.

When a mixture of catalysts is used, such as a mixture of palladium or rhodium-containing material and an oxide of Group V–B or VI–B metals, the weight ratio is generally in the range between about 0.001:1 and about 25:1, and preferably in the range between about 0.05:1 and about 10:1.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic carbodiimide in the solvent is in the range between about 2.0 and about 75 percent, but greater or lesser proportions may be employed if desired.

The order of mixing the reactants is not critical and may be varied within the limitations of the equipment employed. In one embodiment, the organic carbodiimide compound, catalyst, and, if desired, solvent, is charged to a suitable pressure vessel such as an autoclave which was previously purged with nitrogen, and which is preferably provided with agitation means such as a stirrer or an external rocking mechanism.

Another reactant in the process of this invention is a carbon oxide gas such as carbon monoxide, carbon dioxide, and mixtures thereof. This gas can be used (either individually as CO or $CO_2$, or admixed with each other) to initially generate the pressure in the reactor, or may also be added during the reaction if necessary. For purposes of simplicity, the term "carbon oxide gas" will be used throughout the description and claims to define carbon monoxide, carbon dioxide, and mixtures thereof. Carbon oxide gas is fed into the autoclave until a pressure is attained which is in the range between about 30 and about 10,000 p.s.i.g., and preferably between about 100 and about 8000 p.s.i.g., but greater or lesser pressures may be employed if desired.

Generally the quantity of carbon oxide gas in the free space of the reactor is sufficient to maintain the desired pressure as well as provide reactant for the process, as the reaction progresses. If desired, additional carbon oxide gas can be fed to the reactor either intermittently or continuously as the reaction progresses. The reaction is believed to progress in accordance with the following equation, when $CO_2$ is used:

$$RN=C=NR' + CO_2 \rightarrow RNCO + R'NCO$$

where R and R′ are the organic moiety of the organic carbodiimide compound reactant of the type defined above. The total amount of carbon oxide gas added during the reaction is generally between about 1 and about 50, and preferably between about 8 and about 15 moles of carbon oxide gas per mole of the organic carbodiimide compound. Greater or lesser amounts may be employed if desired. The highest carbon oxide gas requirements are generally utilized in a process in which the carbon oxide gas is added continuously, but suitable recycle of the carbon oxide containing gas streams greatly reduces the overall consumption of carbon oxide gas.

The reaction temperature is maintained above about 25° C. and preferably between about 100 and about 250° C. Interior and/or exterior heating and cooling means may be employed to maintain the temperature within the reactor within the desired range.

The reaction time is dependent upon the organic carbodiimide compound being reacted, the temperature and the pressure, the amount of catalyst being charged and the type of equipment utilized. Usually between ½ hour and 20 hours are required to obtain the desired degree of reaction in a batch technique. Both shorter or longer reaction times may be employed if desired. In a continuous process the reaction may be much faster, i.e., substantially instantaneous, and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation technique may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic carbodiimide compound and any by-products that may be formed.

Although the process of this invention has been described above in connection with the formation of organic isocyanates from substantially pure organic carbodiimides, it should be recognized that relatively impure materials containing organic carbodiimides can also be treated in accordance with the process of this invention to convert organic carbodiimides contained therein into organic isocyanates. For example, as indicated in U.S. Pat. No. 3,140,305, which is herein incorporated by reference in its entirety, describes a process in which aromatic diamines such as diaminotoluene are reacted with phosgene and the reaction product is then distilled to volatilize a large portion of the diisocyanate, but leaving a distillation residue containing high boiling reaction products including ureas, polyureas, polybiurets, and isocyanurates. Although not specified in the patent, the distillation residue also contains a substantial proportion of organic carbodiimides, for example between about 1 and about 50 percent by weight of diisocyanato-tolyl carbodiimide. This distillation residue, if desired, may be reacted with the carbon oxide gas in the presence of a catalyst, in accordance with the process of this invention, to convert the carbodiimides to organic isocyanates.

If desired, the distillation residue described in U.S. Pat. 3,140,305 may be subjected to the process of this patent by heating it as a thin falling film, to effect distillation of a portion of the toluene diisocyanate contained therein. The evaporation residue which contains a large proportion of high boiling impurities also contains between about 1 and about 40 percent by weight of organic carbodiimides and between about 5 and about 50 percent by weight of isocyanates. This evaporation residue, if it is dissolved in a suitable solvent as the type described prior to solidification, may be also treated if desired in accordance with the process of this invention to convert carbodiimides contained therein to organic isocyanates.

Organic isocyanates produced in accordance with the technique of this invention are suitable for use in preparing urethane compounds such as foams, coatings, fibers, and the like by reacting the organic isocyanate with a suitable polyether polyol in the presence of a catalyst and, if desired, a foaming agent, and as intermediates for biologically active compounds.

The following examples are presented to describe the invention more fully without any intention of being limited thereby. All parts and percentages are by weight unless otherwise specified.

EXAMPLE 1

A rocking autoclave, constructed of 316 stainless steel, having a volume of 103 ml. was charged with 3 g. of diphenyl carbodiimide, 5 ml. of orthodichlorobenzene, and based upon the weight of the carbodiimide, 3.0 percent rhodium trichloride, and 6.0% vanadium pentoxide. The reactor was closed, purged, and then pressurized with carbon monoxide to about 2500 p.s.i.g. The reaction mixture was heated to 190° C., and maintained at this temperature for 1.5 hours, during which time the maximum pressure of about 4000 p.s.i.g. was attained. After cooling to room temperature, the autoclave was vented and the reaction mixture was filtered. A vapor phase chromatography analysis of the filtrate indicated a conversion of 53.3 percent of the carbodiimide. The yield of phenyl diisocyanate was 32.0 percent.

EXAMPLES 2–14

The procedure of Example 1 was repeated with the exception that the catalyst, catalyst proportion, carbodiimide, and carbodiimide proportion were changed where indicated in the table, which also shows conversion of carbodiimide and yield of isocyanate product.

TABLE 2.—REACTIONS OF DIPHENYLCARBODIIMIDE WITH $CO_2$

| Example | Catalyst and amount | Initial $CO_2$ pressure, p.s.i.g. | Percent Conversion | Yield of isocyanate |
|---|---|---|---|---|
| 15 | $PdCl_2$, 3% | 800 | 41.6 | 11.4 |
| 16 | $PdCl_2$, 3% | 400 | 87.6 | 6.4 |
| 17 | $RhCl_3$, 3% | 800 | 40.2 | 15.3 |
| 18 | $RhCl_3$, 3% | 400 | 59.5 | 8.4 |
| 19 | $PdCl_2$, 3%; $V_2O_5$, 6% | 800 | 52.7 | 8.8 |
| 20 | $PdCl_2$, 3%; $V_2O_5$, 6% | 400 | 66.3 | 11.8 |
| 21 | $PdCl_2$, 3%; $V_2O_5$, 6% | 400 | 41.5 | 13.1 |
| 22 | $RhCl_3$, 3%; $V_2O_5$, 6% | 800 | 34.3 | 18.8 |
| 23 | $RhCl_3$, 3%; $V_2O_5$, 6% | 400 | 48.5 | 16.1 |

Various modifications of the invention, some of which have been referred to above, may be employed without departing from the spirit of the invention.

What is desired to be secured by Letters Patent is:

1. The process for preparing an organic isocyanate which comprises reacting at an elevated temperature and an elevated pressure
    (A) an organic carbodiimide selected from the group consisting of
        (1) diphenyl carbodiimide,
        (2) ditolyl carbodiimide,
        (3) dicyclohexyl carbodiimide,
        (4) carbodiimide-containing evaporation residues formed in processes for preparing toluene diisocyanates by phosgenation of diaminotoluene,
        (5) and mixtures thereof,
    (B) a carbon oxide gas selected from the group consisting of
        (1) carbon monoxide,
        (2) carbon dioxide and
        (3) mixtures thereof,
    (C) in the presence of a catalytic proportion of a catalyst system selected from the group consisting of
        (1) Palladium dichloride
        (2) Rhodium trichloride
        (3) Palladium dichloride and vanadium pentoxide
        (4) Palladium dichloride and molybdenum dioxide
        (5) Rhodium trichloride and vanadium pentoxide
        (6) Rhodium trichloride and molybdenum trioxide
        (7) Molybdenum hexacarbonyl
        (8) Palladium dipyridine dichloride
        (9) Molybdenum trioxide and cupric chloride
        (10) Palladium dipyridine dichloride and $MoO_3$

TABLE 1.—REACTIONS OF CARBODIIMIDES WITH CO

| Example | Carbodiimide charged and amount | Catalyst and amount | Percent Conversion | Yield of isocyanate |
|---|---|---|---|---|
| 2 | Diphenyl carbodiimide, 3.0 g | $PdCl_2$, 3% | 85.5 | 10.8 |
| 3 | do | $RhCl_3$, 3% | 20.0 | 36.2 |
| 4 | do | $PdCl_2$, 3%; $V_2O_5$, 6% | 73.0 | 22.8 |
| 5 | Dicyclohexylcarbodiimide, 1.0 g | $PdCl_2$, 10%; $V_2O_5$, 10% | 56.4 | 25.7 |
| 6 | do | $RhCl_3$, 10%; $V_2O_5$, 10% | 57.6 | 36.8 |
| 7 | Dicyclohexylcarbodiimide, 3.0 g | $PdCl_2$, 3%; $V_2O_5$, 3% | 31.2 | 28.4 |
| 8 | do | $RhCl_3$, 3%; $V_2O_5$, 3% | 33.3 | 34.2 |
| 9 | Dicyclohexylcarbodiimide, 1.0 g | $RhCl_3$, 10%; $MoO_3$, 10% | 64.3 | 19.6 |
| 10 | do | $RhCl_3$, 10%; $Mo(CO)_6$, 10% | 77.8 | 3.6 |
| 11 | do | $Pd(py)_2Cl_2$, 12% [1] | 64.3 | 4.0 |
| 12 | do | $Pd(IQn)_2Cl_2$, 12% [2] | 43.3 | 12.5 |
| 13 | do | $MoO_3$, 10%; $CuCl_2$, 10% | 69.4 | 3.3 |
| 14 | do | $Mo(CO)_6$, 10% | 62.7 | 5.0 |

[1] $Pd(py)_2Cl_2$=palladium dipyridine dichloride.
[2] $Pd(IQn)_2Cl_2$=palladium diisoquinoline dichloride.

EXAMPLES 15–23

The procedure of Example 1 was repeated with the exceptions that the diphenylcarbodiimide was reacted with carbon dioxide at the initial pressure indicated in the table, and in the presence of the catalyst system indicated in the table.

(11) Palladium diisoquinoline dichloride and
    (12) Rhodium trichloride and molybdenum hexacarbonyl.

2. The process of claim 1 wherein the proportion of said catalyst is between about 0.1 and about 100 percent by weight of said organic carbodiimide compound.

3. The process of claim 2 wherein said carbon oxide gas is carbon monoxide.

4. The process of claim 2 wherein said carbon oxide gas is carbon dioxide.

References Cited

UNITED STATES PATENTS

| 3,405,156 | 10/1968 | Stern et al. | 260—453 |
|---|---|---|---|
| 3,461,149 | 8/1969 | Hardy et al. | 260—453 |
| 3,467,687 | 9/1969 | Hardy et al. | 260—453 |
| 3,467,688 | 9/1969 | Bennett et al. | 260—453 |

CHARLES B. PARKER, Primary Examiner

D. H. TORRENCE, Assistant Examiner

U.S. Cl. X.R.

252—429 C 429 R, 438, 440, 441, 461, 467, 472; 260—243 A, 270 R, 453 PH, 476 R, 566 R